(12) United States Patent
Kihara et al.

(10) Patent No.: US 7,828,939 B2
(45) Date of Patent: Nov. 9, 2010

(54) METHOD FOR CONCENTRATING HEAVY NITROGEN ISOTOPE

(75) Inventors: Hitoshi Kihara, Tsuchiura (JP); Takashi Kambe, Tsuchiura (JP); Shigeru Hayashida, Kofu (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 106 days.

(21) Appl. No.: 12/293,361

(22) PCT Filed: Mar. 12, 2007

(86) PCT No.: PCT/JP2007/054765

§ 371 (c)(1),
(2), (4) Date: Sep. 17, 2008

(87) PCT Pub. No.: WO2007/122893

PCT Pub. Date: Nov. 1, 2007

(65) Prior Publication Data

US 2009/0071814 A1    Mar. 19, 2009

(30) Foreign Application Priority Data

Mar. 23, 2006 (JP) .......................... P2006-080345

(51) Int. Cl.
*B01D 59/04* (2006.01)
*C01B 21/04* (2006.01)
*F25J 3/02* (2006.01)

(52) U.S. Cl. .................. 203/5; 62/643; 62/919; 203/78; 203/80; 203/84; 423/351; 423/DIG. 7; 202/154; 202/155; 202/172

(58) Field of Classification Search .............. 62/643, 62/919; 202/154, 155, 172, 173; 203/1–3, 203/5, 78, 80, 84; 423/351, DIG. 7
See application file for complete search history.

(56) References Cited

U.S. PATENT DOCUMENTS 6,202,440 B1    3/2001   Hayashida et al.

(Continued)

FOREIGN PATENT DOCUMENTS

JP    3-47518    2/1991

(Continued)

OTHER PUBLICATIONS

International Search Report for PCT/JP2007/054765, mailed.

(Continued)

*Primary Examiner*—Virginia Manoharan
(74) *Attorney, Agent, or Firm*—Nixon & Vanderhye P.C.

(57) ABSTRACT

A method for concentrating effectively the heavy nitrogen isotope $^{15}N$ to 50 atom % or more in which $^{14}N^{15}N$ and/or $^{15}N_2$, which are molecules containing a heavy nitrogen isotope of $^{15}N$, are concentrated by distilling successively nitrogen $N_2$ using plural distillation columns T1 to T4 each of which includes at least one condenser C1 to C4 and at least one reboiler R1 to R4 and is arranged in series, and a part of nitrogen in the distillation is drawn out to be subjected to isotope scrambling in an isotope scrambler S1, and nitrogen after the isotope scrambling is returned to the distillation to produce nitrogen $N_2$ with a $^{15}N$ concentration of 50 atom % or more.

9 Claims, 3 Drawing Sheets

U.S. PATENT DOCUMENTS 6,321,565 B1 * 11/2001 Kihara et al. .................. 62/643
6,461,583 B1    10/2002 Hayashida et al.
6,835,287 B1    12/2004 Kihara et al.
7,302,812 B2 * 12/2007 Okasinski et al. ............. 62/617

FOREIGN PATENT DOCUMENTS

| JP | 11-188240 | 7/1999 |
| JP | 2001-104756 | 4/2001 |
| JP | 2003-210945 | 7/2003 |
| WO | 00/27509 | 5/2000 |

OTHER PUBLICATIONS

Kambe, T. et al., "Development of Oxygen-18 Separation Unit by Oxygen Distillation", Taiyo Nissan Giho, No. 23, pp. 20-25, (2004).

* cited by examiner

METHOD FOR CONCENTRATING HEAVY NITROGEN ISOTOPE

This application is the U.S. national phase of International Application No. PCT/JP2007/054765, filed 12 Mar. 2007, which designated the U.S. and claims priority to Japan Application Nos. 2006-080345, filed 23 Mar. 2006, the entire contents of each of which are hereby incorporated by reference.

TECHNICAL FIELD

The present invention relates to a method for concentrating stable isotope $^{15}N$ of nitrogen. More specifically, the present invention relates to a method for concentrating $^{15}N$, which is a stable isotope and has an extremely low abundance ratio, to a high concentration effectively by combining distillation at a low temperature and isotope scrambling of nitrogen.

Priority is claimed on Japanese Patent Application No. 2006-80345, filed on Mar. 23, 2006, the contents of which are incorporated herein by reference.

BACKGROUND OF THE PRESENT INVENTION

Nitrogen has two kinds of stable isotopes, $^{14}N$ and $^{15}N$. The natural abundance of 14N and 15N is 99.635 atom % and 0.365 atom % respectively. Moreover, "heavy nitrogen isotope" in the present invention means $^{15}N$.

There are three isotopic molecules of nitrogen, $^{14}N_2$, $^{14}N^{15}N$, and $^{15}N_2$. The abundance ratios thereof are as follows.

$^{14}N_2$: 99.635 atom %×99.635 atom %=99.271 mol %

$^{14}N^{15}N$: 99.635 atom %×0.365 atom %×2=0.727 mol %

$^{15}N_2$: 0.365 atom %×0.365 atom %=0.001 mol %

At present, $^{15}N$, which is a stable isotope of nitrogen, is used as a tracer in mainly natural science fields and medical fields. In addition, usage of $^{15}N$ has also been examined in energy fields. However, the abundance ratio of $^{15}N$ is extremely low. Therefore, a method for effectively concentrating $^{15}N$ to a high concentration is desired. Examples of a method for concentrating $^{15}N$ include a chemical exchange method which uses the phenomena by which the equilibrium distribution concentration of isotopes varies depending on the kinds of compound, a vapor adsorption method which uses the difference in adsorption behavior of ammonia to zeolite due to an isotope effect, and a low temperature distillation method which produces $^{15}N$ and $^{18}O$ by distilling nitrogen monoxide (NO) at low temperatures to concentrate $^{15}N^{18}O$.

Examples of the method for concentrating isotopes by low temperature distillation include a carbon monoxide distillation method and a methane distillation method in which $^{13}C$ is concentrated, in addition to the nitrogen monoxide distillation in which $^{15}N$ and $^{18}O$ are concentrated. Furthermore, a method, in which $^{18}O$ is highly concentrated by combining oxygen distillation and isotope scrambling can also be used.

DISCLOSURE OF THE INVENTION

Problems to be Solved by the Invention

The chemical exchange method and the vapor adsorption method for concentrating $^{15}N$ are not suitable for large production on an industrial scale. In addition, isotopes are separated using a nitrogen compound in these methods. Therefore, it is not easy to produce $N_2$ with a high concentration which does not finally contain impurities other than $N_2$.

The nitrogen monoxide distillation is also not suitable because oxygen atoms must be separated (removed) in a post process. In addition, nitrogen monoxide has toxicity and causticity, and there is a problem in handling.

In order to produce a product with a high concentration on a large scale, a nitrogen distillation method at low temperature shows promise. However, when $^{15}N$ is concentrated to 50 atom % or more, there are the following problems.

Specifically, the composition of nitrogen isotopes is $^{14}N_2$: 99.272 mol %, $^{14}N^{15}N$: 0.727 mol %, and $^{15}N_2$: 13.3 ppm. Even if $^{14}N^{15}N$, which exists more abundantly than $^{15}N_2$, is concentrated to 100 mol %, the isotopic concentration of $^{15}N$ only becomes 50 atom %. This means that $^{15}N_2$, which exists in extremely small amounts, has to be concentrated highly to make the concentration of $^{15}N$ 50 atom % or more. In other words, in order to obtain $^{15}N$ of 80 atom %, $^{15}N_2$ has to be concentrated to at least 60 mol %. In this instance, the amount of a raw material needed is at least 45,000 times or more (60 mol %/13.3 ppm=45,000) of a product.

In order to concentrate $^{15}N_2$ to 99 atom %, $^{15}N_2$ has to be concentrated to at least 98 mol %. 73,000 (98 mol %/13.3 ppm) times or more of a raw material relative to the amount of a product is needed. In this instance, the product contains only 2 mol % of $^{14}N^{15}N$, and almost all of $^{14}N^{15}N$ is discharged. Therefore, the yield percentage of $^{15}N$ is 0.37% or less (99 atom %/0.365 atom %/73000=0.37%). The isotope separation process is not effective.

It is not realistic that the yield percentage of $^{15}N_2$ can be 100%. Actually, it is considered that 10 times or more of the amount of the raw material, which is calculated above, is necessary. Therefore, the actual yield percentage of $^{15}N$ is further tenth part of the calculated one or less.

As explained above, when $^{15}N$ is concentrated by distilling $N_2$, which is a diatomic molecule of nitrogen, at low temperatures, the difficulty depends largely on whether the concentration of a product isotope is 50 atom % or less or 50 atom % or more. When the concentration of a product isotope is 50 atom % or less, it is possible to achieve the concentration by only concentrating $^{14}N^{15}N$, which exists relatively abundantly. However, in the case of 50 atom % or more, $^{15}N_2$, which exists in extremely small amounts, has to be concentrated, and a large amount of a raw material is necessary.

In addition, when $^{15}N$ is concentrated by distilling nitrogen at low temperatures, there are the following problems.

In a process of concentrating $^{18}O$ by distilling oxygen at low temperatures, oxygen can be obtained by a cryogenic air separation device using air as a raw material. However, the air contains argon of several thousand ppm, and hydrocarbons of several dozen ppm. When these components are arranged in a line in order of vapor pressure together with oxygen isotopes, the order is: argon>$^{16}O_2$>$^{18}O_2$>> carbon hydrides. Since the vapor pressures of hydrocarbons are much smaller than those of argon and oxygen, removal of hydrocarbons by distillation is relatively easy. Therefore, when carbon hydrogen is removed before supplying oxygen as a raw material in a cascade (abbreviated as "distillation cascade" below) in which plural distillation columns are connected in series, $^{18}O_2$, which has the lowest vapor pressure, can be concentrated relatively easily at the bottom portion of the final column.

Nitrogen can also be produced by a cryogenic air separation device using air as raw material. In general, nitrogen contains oxygen in a range from 0.01 ppm to 10 ppm, and argon in a range from 1 ppm to 1,000 ppm. When these components are arranged in a line in order of vapor pressure together with nitrogen molecules containing isotopes, the order is: $^{14}N_2 > ^{15}N_2 >$ argon > oxygen. When $^{15}N_2$ is concentrated by a distillation cascade, argon and oxygen, which are impurities, are highly concentrated at the bottom portion of the final column.

In the isotope separation process, a reflux ratio is extremely large. Therefore, in a case of a $^{15}N$ concentration process of which the abundance ratio relative to nitrogen contained in a raw material is ten thousandths of a part, argon and oxygen entrained with the raw material nitrogen are concentrated ten thousand-fold at the bottom portion of the final column constituting the distillation cascade. For example, when the raw material nitrogen contains argon of 50 ppm, and oxygen of 0.1 ppm, the concentration of argon and oxygen at the bottom portion of the final column in the distillation cascade becomes 50 mol % and 0.1 mol %, respectively.

In general, it is often the case that the concentration of oxygen in the nitrogen product is desirably several ppm or less. In order to decrease the amount of oxygen in a concentrated nitrogen product to 1 ppm or less, the amount of oxygen in the raw material nitrogen has to be 0.1 ppb or less in this instance. Moreover, argon rarely does cause problems because argon is an inactive gas. However, since argon is contained in the nitrogen raw material at a level of several dozen to several hundred times that of oxygen, argon is extremely highly concentrated at the bottom portion of the final column.

It is possible to remove argon and oxygen contained in a nitrogen raw material before supplying to the distillation cascade. However, there is a problem in that the concentration of $^{14}N^{15}N$ and $^{15}N_2$ is also reduced in this case.

In addition, since a liquid hold-up amount is extremely large in a conventional isotope concentration process using a distillation cascade, there is another problem in that the start-up time is extremely long such as several months to several years.

In summary, there is a case in which when a nitrogen raw material is highly purified and then supplied to the distillation cascade to separate $^{15}N$ by a nitrogen distillation method, concentration of argon and oxygen in the $^{15}N$ product may be unavoidable. In particular, oxygen is chemically active. In many cases, the concentration of oxygen is not suitable. In addition, high purification of a nitrogen raw material causes a problem in that the concentration of isotopes containing $^{15}N$ decreases.

In consideration of the above-described problems, it is an object of the present invention is to provide a method for concentrating heavy nitrogen isotope to 50 atom % or more which can provide nitrogen containing concentrated heavy nitrogen isotope on an industrial scale in large quantities. In addition, another object of the present invention is to provide a method for producing nitrogen containing concentrated heavy nitrogen isotope which almost never contains high boiling point components, such as argon, and oxygen, on an industrial scale in large quantities. Furthermore, it is another object of the present invention to provide a method for concentrating heavy nitrogen isotope in a shorter start-up time than in the past.

Means for Solving the Problem

In order to solve the problems, the present invention provides a method for concentrating heavy nitrogen isotope $^{15}N$ in which $^{14}N^{15}N$ and/or $^{15}N_2$, which are molecules containing the heavy nitrogen isotope $^{15}N$, are concentrated, wherein the method comprises distilling successively nitrogen $N_2$ using plural distillation columns each of which comprises at least one condenser and at least one reboiler and are arranged in series, and a part of the nitrogen in the distillation is drawn out to be subjected to isotope scrambling, and nitrogen after the isotope scrambling is returned to the distillation to produce nitrogen $N_2$ with $^{15}N$ concentration of 50 atom % or more.

In the concentration method, it is preferable that a collecting position of a product containing concentrated $^{15}N$ be a middle portion of the final distillation column, which is 2 to 10 m above the bottom of the final distillation column. Thereby, $^{15}N$ concentrated nitrogen which contains almost no high boiling components, such as oxygen and argon, can be obtained.

It is preferable that the flow rate of gas or liquid which is drawn from the bottom portion of the final distillation column be 80% to 100% relative to 100% of the total amount of argon and oxygen contained in a raw material nitrogen. Thereby, it is possible to decrease the nitrogen concentration at the bottom portion of the final distillation column, and reduce the amount of $^{15}N$ discharged together with argon and oxygen to a minimum. In addition, it is also possible to prevent the $^{15}N$ product from being contaminated with argon and oxygen. It is also preferable that the nitrogen concentration at the bottom portion of the final distillation column be measured, and the amount of the gas or liquid which is drawn from the bottom portion of the final distillation column be adjusted such that the measured value be 1 mol or less. When the amount of the gas or liquid which is drawn from the bottom portion of the final distillation column is too small to control successively the flow rate, it is possible to draw out a certain amount of the gas or liquid every certain period of time.

When concentrated argon and oxygen are drawn out from the bottom portion of the final distillation column, it is not necessary to store $^{15}N_2$ in a reboiler in the bottom portion of the final distillation column. Therefore, it is possible to reduce remarkably the hold-up amount of $^{15}N_2$, and the start-up time can also be remarkably reduced.

It is preferable that the position for drawing nitrogen during distillation to perform isotope scrambling be the position at which the concentration of $^{14}N^{15}N$ is the largest.

The nitrogen after the isotope scrambling may be returned to the position where the nitrogen is drawn out, or other positions.

In addition, supplying $N_2$ from a certain distillation column other than the final distillation column to another distillation column which is the next stage is performed using the pressure difference between the two distillation columns as driving force. In this case, $N_2$ is resent from a certain distillation column other than the first column to another distillation column of the former stage using a liquid head pressure of nitrogen as driving force.

It is preferable that a cooling fluid used in the condenser be nitrogen ($N_2$) which is other than nitrogen ($N_2$) to be distilled in the distillation step. When nitrogen in the other system is used, it is easy to control the pressure at the top portion of the distillation column provided with the condenser. Thereby, it is also easy to control properly the pressure difference which is the driving force to supply $N_2$ from a former distillation column to the distillation column provided with the condenser in the next step.

In the distillation of nitrogen isotopes, the amount of throughput is extremely decreased in the latter distillation column, compared to ordinary distillations. Due to this, the amount of nitrogen which is returned to the former distillation column is also decreased. When the distillation temperature is extremely low, there is a concern that nitrogen which is returning is gasified inside the pipes. When nitrogen which is returning is gasified, it is impossible to produce a required liquid head pressure. Thereby, $N_2$ is not returned, and a desired distillation performance cannot be obtained. In order to reliably obtain a required liquid head pressure, it is preferable that a pipe for returning $N_2$ to the previous distillation column be cooled.

It is preferable that the pipe be cooled with liquid nitrogen as a cooling medium, and the liquid nitrogen be nitrogen used in the condenser provided with the distillation column. When nitrogen used in the condenser is used as a cooling medium, it is possible to prevent supercooling.

In addition, it is preferable that the content of argon and/or oxygen in the raw material nitrogen be 10 ppm or less. In particular, when oxygen with a high concentration exists in the isotope scrambling, NOx may be formed depending on the method of the isotope scrambling. Therefore, the oxygen concentration is preferably small.

Effects of the Present Invention

According to the present invention, $^{15}N$ can be easily concentrated to 50 atom % or more by combining low temperature distillation and an isotope scrambling of nitrogen. Therefore, $^{15}N$ can be produced more easily with higher concentration on larger scale compared with conventional methods.

According to the conventional $N_2$ distillation methods, it is impossible to highly concentrate $^{15}N$ (for example, to 50 atom % or more). However, the yield of $^{15}N$ can be remarkably increased by combining low temperature distillation and isotope scrambling. That is, a high concentration of $^{15}N$ is achieved.

In the conventional $N_2$ distillation methods, it is not easy to produce a product which almost never contains argon and oxygen within a short start-up period of time. However, this is achieved by combining low temperature distillation and isotope scrambling, and concentrating argon and oxygen into the bottom portion of the final distillation column constituting the distillation cascade in the present invention.

EXPLANATION OF REFERENCE SYMBOLS

T1, T2, T3, T4: distillation column
C1, C2, C3, C4: condenser
R1, R2, R3, R4: reboiler
S1: scrambler

BEST MODE FOR CARRYING OUT THE INVENTION

The method of the present invention is a method in which nitrogen ($N_2$) with a high purity is used as raw material to concentrate $^{15}N$ to a high concentration (50 atom % or more).

Figure 1:
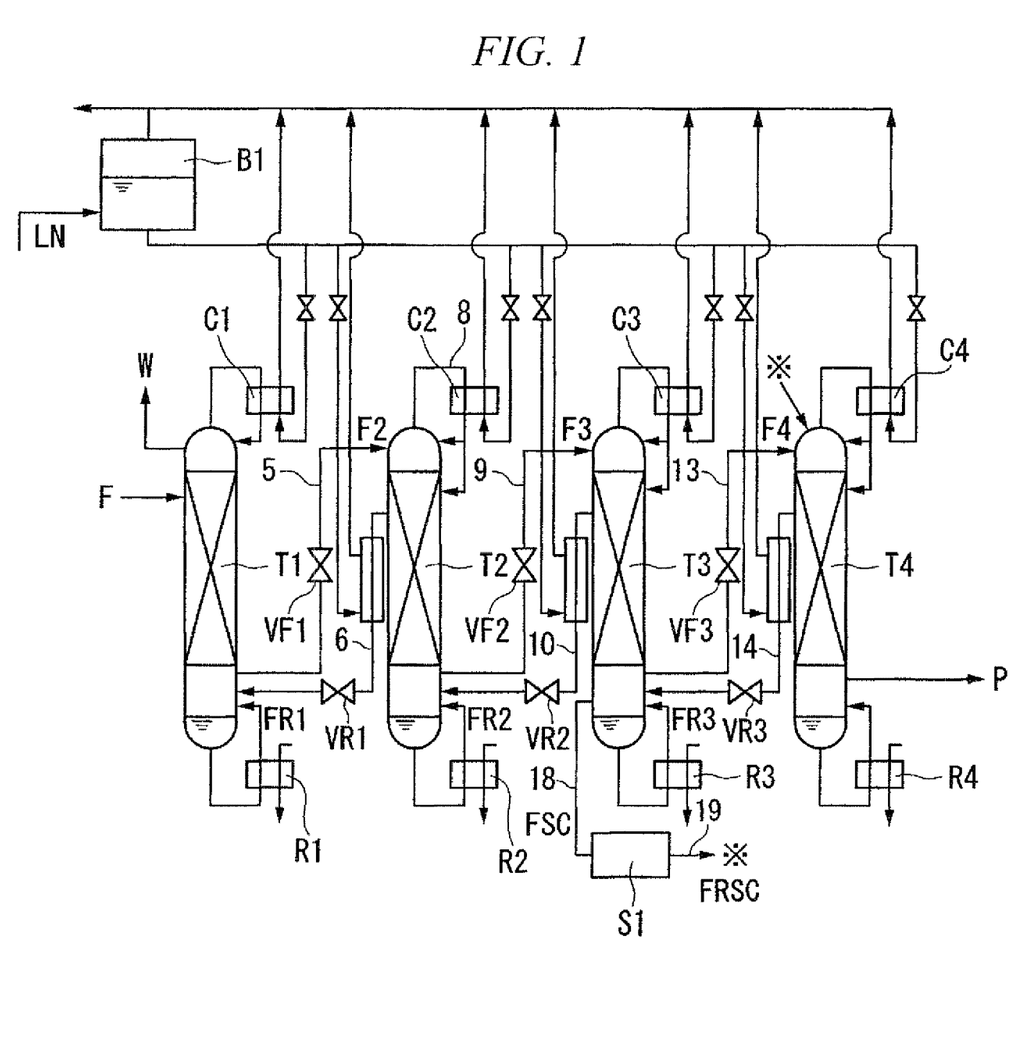
FIG. 1 is a schematic view showing an apparatus which can be used to carry out the concentrating method for the heavy nitrogen isotope according to the present invention.

FIG. 1 shows one example of an apparatus which can be used to carry out the concentrating method according to the present invention.

The apparatus comprises mainly four distillation columns of a first column T1 to a fourth column T4, reboilers R1 to R4 and condensers C1 to C4 each of which is respectively provided with the distillation column, and an isotope scrambler S1. The actual apparatus may comprise further distillation columns. However, in order to explain clearly the present invention, the apparatus comprising four distillation columns is explained in this embodiment.

A raw material F (nitrogen) is supplied to the apparatus. The raw material F is separated into a product P which is nitrogen with a high purity of $^{15}N$ and an exhaust gas W with a low purity of $^{15}N$.

In the four distillation columns, the bottom portion of the first column T1 and the top portion of the second column, the bottom portion of the second column and the top portion of the third column, and the bottom portion of the third column and the top portion of the fourth column are connected. Thereby, successive distillations can be carried out in all of the first to fourth columns. Low boiling point components in the distillation columns are concentrated as they move toward the top portion of the first column. High boiling components are concentrated as they move toward the bottom portion of the fourth column.

Below, the concentration method of the present invention will be explained in detail referring to FIG. 1.

The raw material F is supplied to the middle portion of the first column T1. The raw material F is manufactured by a cryogenic air separation device (not shown in FIG. 1) using air as raw material. The raw material F is nitrogen, and the purity is preferably high, such as 99.999 mol % or more. The nitrogen ($N_2$) may be in a gaseous state, liquid state, or a mixture of gas and liquid. When the nitrogen is in a gaseous state, it is preferable to supply nitrogen gas which is cooled to about the dew point.

Inside of the first column, vapor ascending from the bottom portion and liquid descending from the upper make contact. During this gas-liquid contact, $^{14}N_2$, of which the boiling point is the lowest, is concentrated into the vapor side which occupies the upper portion. $^{15}N_2$, of which the boiling point is the highest, is concentrated into the liquid side which occupies the lower portion. $^{14}N^{15}N$, of which the boiling point is the middle between them, behaves intermediately between them.

In order for the vapor and the liquid in the distillation column to make contact, a plate column or a packed column may be used. However, since a packed column can reduce the hold-up amount of liquid in the entire apparatus, and start-up period of time, a packed column is preferable.

The packing may be structured packing or random packing

The liquid which descends in the distillation column and is accumulated in the bottom portion is vaporized by the reboiler R1, and returned to the bottom portion of the distillation column. Thereby, the ascending vapor is generated. In contrast, the vapor which ascends and flows out from the top portion is liquefied by the condenser C1, and returned to the top portion of the distillation column (that is, the vapor is refluxed). Thereby, the descending liquid is generated.

When the operating pressure in the distillation columns is smaller, relative volatility of nitrogen molecules containing isotopes is larger, and nitrogen is easily separated. It is preferable that the pressure at the top portion of the column be 150 kPa (gauge) or less as long as it is not negative.

The pressure at the top portion of the column is determined by the temperature difference between the cooling fluid of the condenser and the fluid. In the present invention, $N_2$ other than distilled $N_2$ can be used as a cooling fluid of the condenser.

Basic operation conditions, such as the ascending vapor rate, and pressure in the second to fourth column T2 to T4, may be the same as those of the first column T1.

A part of the vapor reaching the top portion of the first column T1 is discharged as a discharged gas W containing a decreased amount of $^{15}$N. The discharged gas W can be recovered by liquefying as a highly pure nitrogen product. The flow rate of the discharged gas W is determined by subtracting the amount of the product P from the amount of the raw material F by material balance. In reality, it is preferable that the amount of the discharged gas W be determined such that the liquid level at the bottom portion of the first distillation column T1 be substantially fixed.

A part of the vapor containing the heavy isotope with an enhanced concentration at the bottom portion of the first column is supplied to the top portion of the second column T2 as a feed F2 of the second column, via the pipe 5 and the valve VF1. The vapor may also be supplied into the pipe 8 which is connected with the inlet of the condenser C2. The driving force of the vapor is the difference between the pressure at the bottom portion of the first column T1 and the pressure at the top portion of the second column T2. The feed F2 of the second column T2 is liquefied by the condenser C2 together with the ascending vapor from the top portion of the second column T2, and then they are refluxed to the top portion of the second column T2. Similarly to the first column T1, the vapor-liquid contact is performed in the second column T2. The concentration of the heavy isotope is gradually increased toward the bottom portion in the second column T2.

It is preferable that the flow rate of the feed F2 of the second column be adjusted such that the yield percentage of the product P ($^{15}$N) relative to the amount of the feed F2 of the second column be fixed in a range of 20% or less. A part of the liquid which is refluxed to the top portion of the second column T2 is returned into the bottom portion of the first column T1 as the returning liquid FR1, via the pipe 6 and the valve VR1.

The flow rate of the returning liquid FR1 is determined by subtracting the amount of the product P from the amount of the feed F2 by material balance. In reality, the amount of the returning liquid FR1 is determined such that the liquid level at the bottom portion of the second distillation column T2 is substantially fixed.

The driving force of the returning liquid FR1 is the head pressure of the liquid stored at the primary side of the valve VR1. When heat in-leak into the pipe is large, there is a concern that a sufficient head pressure of the liquid may not be obtained. In general, when a distillation is performed at extremely low temperatures, there is a case in which vacuum insulated pipes are adopted to prevent heat in-leak. The distillation for separating nitrogen isotopes has a characteristic that the more latter distillation column is, the smaller the amount of nitrogen returning to the former distillation column. Therefore, preventing heat in-leak is particularly important. Therefore, when liquid is not stored in the inlet side of the valves VR1, VR2, VR3, . . . , it is preferable to cool positively the pipe at the inlet side of the valve.

The liquid for cooling the pipe at the inlet side is preferably low temperature nitrogen. It is also preferable that the cooling fluid used in the heat exchange cycle of the condenser be divided to use as the liquid for cooling the pipe. Since the cooling fluid which is divided from the heat exchange cycle has a suitable temperature for liquefying the gas at the top portion of the distillation column provided with the condenser, the cooling liquid is most preferably used to cool the pipe at the inlet side.

The third column T3 and the fourth column T4 have the same structure as the first column T1. In addition, the connecting path between the third column T3 and the fourth column T4 is also the same as that used in the first and second columns explained above. Therefore, the first to the fourth columns T1 to T4 are connected in series, and distill N$_2$ as if they are one distillation column as a whole. $^{15}$N$_2$, which has the highest boiling point, is concentrated toward the bottom portion of the fourth column T4. $^{14}$N$_2$, which has the lowest boiling point, is concentrated toward the top portion of the first column T1. $^{14}$N$^{15}$N, which has the middle boiling point between them, behaves intermediately between them.

Since the distillation columns T1 to T4 are operated at extremely low temperatures, they are stored in a cold box (not shown in FIG. 1) in order to minimize heat in-leak from the outside.

A partial gas FSC of the gas at the bottom portion of the third column T3 is sent into the isotope scrambler S1, via the pipe 18. The gas FSC is heated to about room temperature by a heat exchanger, if necessary. The gas FRSC after isotope scrambling is returned to the top portion of the fourth column T4, via the pipe 19. The gas FRSC is cooled by a heat exchanger, if necessary.

The connection portion between the isotope scrambler S1 and the distillation column is not limited to the portion shown in FIG. 1. That is, the portion of the distillation column which connects with the pipe 18 may be at any position. However, the portion where the concentration of the intermediate component $^{14}$N$^{14}$N is the highest is preferable. The connection portion between the distillation column and the pipe 19 is preferably the portion where the concentration of the target component $^{15}$N$_2$ is approximately equal to the concentration of the $^{15}$N$_2$ contained in the gas FRSC. When the driving force of the gas passing through the pipe 18→the isotope scrambler S1→the pipe 19 is insufficient, a pressure rising device (not shown in FIG. 1), such as a blower, may be provided with the pipe 18, the pipe 19, or in the scrambler S1.

The isotope scrambler S1 has the following functions.

The isotope scrambler S1 used in the present invention is a device for changing randomly three kinds of combination between $^{14}$N and $^{15}$N, which has an imbalance due to a series of distillations. In other words, the isotope scrambler is a device for dissociating temporarily the N—N bond of $^{14}$N$_2$, $^{14}$N$^{15}$N, and $^{15}$N$_2$, and randomly forming the N—N bond again.

A part of $^{14}$N$^{15}$N which is concentrated by a series of distillations can be changed to $^{15}$N$_2$ by adjusting the connection position between the isotope scrambler S1 and the distillation column. Thereby, the amount of $^{15}$N$_2$ supplied to the distillation column can be remarkably increased. As a result, $^{15}$N can be remarkably concentrated with a higher efficiency compared with nitrogen distillation without the isotope scrambler. In other words, the problem whereby in order to concentrate $^{15}$N to 50 atom % or more by nitrogen distillation at low temperatures, $^{15}$N$_2$ has to be highly concentrated, and a large amount of the raw material is required can be solved.

When the molar fraction of $^{14}$N$_2$, $^{14}$N$^{15}$N, and $^{15}$N$_2$ in the gas FRC supplied in the isotope scrambler S1 is denoted by x, y, and z (0<x, y, z<1, and x+y+z=1) respectively, the flow rate of the gas FRC is denoted by V [mol/s]. Nitrogen comprising two atoms is divided once into each atom by the isotope scrambler explained below. At this time, the isotopic concentration (atomic percentage, α and β) of $^{14}$N and $^{15}$N is denoted by the following formulae.

$$\alpha = x + y \times \tfrac{1}{2}$$

$$\beta = y \times \tfrac{1}{2} + z$$

When the atoms form a nitrogen molecule (a molecule comprising two atoms) again, the concentration (x', y', and z')

of $^{14}N_2$, $^{14}N^{15}N$, and $^{15}N_2$ is denoted by the following formulae because two nitrogen atoms are bonded randomly.

$$x'=\alpha^2=(x+y\times\frac{1}{2})^2$$

$$y'=2\times\alpha\times\beta=2\times(x+y\times\frac{1}{2})(y\times\frac{1}{2}+z)$$

$$z'=\beta^2=(y\times\frac{1}{2}+z)^2$$

Therefore, the percentage change of $^{14}N_2$, $^{14}N^{15}N$, and $^{15}N_2$ before and after the isotope scrambling is denoted by the following formulae.

$$\Delta^{14}N_2=x'-x=(x+y\times\frac{1}{2})^2-x$$

$$\Delta^{14}N^{15}N=y'-y=(x+y\times\frac{1}{2})(y\times\frac{1}{2}+z)\times 2-y$$

$$\Delta^{15}N_2=z'-z=(y\times\frac{1}{2}+z)^2-z$$

$$(\Delta^{14}N_2+\Delta^{14}N^{15}N+\Delta^{15}N_2=0)$$

The portion in the distillation column connected with the pipe 18 connecting the isotope scrambler S1 is preferably selected such that $\Delta^{15}N_2$ is positive and as large as possible. When the pipe 18 is connected to the wrong portion, $^{15}N_2$ is decreased adversely.

The amount of $^{15}N_2$ newly formed in the isotope scrambler is $\Delta^{15}N_2 \times V$ [mol/s]. The flow rate V of the gas FSC supplied into the isotope scrambler S1 is preferably controlled such that $\Delta^{15}N_2 \times V$ [mol/s] is larger than the amount of $^{15}N_2$ contained in the product P.

The method of the isotope scrambling may be any method as long as the molecule $N_2$ is dissociated temporarily and returned finally into $N_2$. Only $N_2$ may be subjected to the isotope scrambling. After reacting with another material, $N_2$ may be returned into the $N_2$ molecule again. Examples of the former method include the following methods:

A method in which a catalytic reaction is used. The method can use a catalyst containing iron (Fe) or ruthenium (Ru) as a main component;

a method in which $N_2$ passes through plasma formed by silent discharge, high frequency discharge, or electromagnetic induction;

a method in which ultraviolet rays, X rays, or γ rays are irradiated to $N_2$; and a method in which the molecular $N_2$ is subjected to a heat treatment at high temperatures such as 800° C. or more.

Examples of the latter method include the following methods

A method in which $N_2$ is reacted once to obtain NOx or $NH_3$, then they are returned to $N_2$.

$^{15}N_2$ is concentrated to the highest concentration by a series of the first to fourth columns T1 to T4 at the bottom portion of the fourth column T4. The product P which is the concentrated $^{15}N$ can be obtained by removing the gas or liquid from there. The concentration of the isotope $^{15}N$ is gradually decreased from the bottom portion of the fourth column T4 to the top portion of the first column T1. It is also possible to obtain the second product (not shown in FIG. 1) having a desired concentration at a certain portion from the bottom portion of the fourth column T4 to the top portion of the first column T1.

Below, the method for concentrating the heavy nitrogen isotope is explained in detail referring to Examples and Comparative Examples.

Example 1

Concentration of $^{15}N$ was simulated using the apparatus shown in FIG. 1. The program for calculating distillation used in the simulation is explained in detail in Patent Document 3. This was applied to the nitrogen isotope containing three components.

The raw material, that is, the raw material $N_2$, was purified so as not to contain argon and oxygen in advance as shown in Table 1. The specifications and operation conditions of the distillation columns are shown in Table 2.

TABLE 1

| Flow rate of the raw material $N_2$ | [mol-$N_2$/s] | 1.0 |
|---|---|---|
| The composition of the raw material $N_2$ | | |
| $^{14}N_2$ | [mol %] | 99.27 |
| $^{14}N^{15}N$ | [mol %] | 0.727 |
| $^{15}N_2$ | [mol %] | 0.0013 |
| $^{14}N$ | [atom %] | 99.635 |
| $^{15}N$ | [atom %] | 0.365 |

TABLE 2

| Column Number | T1 | T2 | T3 | T4 |
|---|---|---|---|---|
| Diameter of the column [mm] | 1000 | 650 | 400 | 250 |
| Height of the column [m] | 100 | 100 | 100 | 100 |
| Packing | structured packing (specific surface area: 500 m$^2$/m$^3$) | | | |
| Pressure at the top portion [kPaG] | 70 | 70 | 70 | 70 |
| superficial F-factor [m/s(kg/m$^3$)$^{0.5}$] | 1.7 | 1.7 | 1.7 | 1.7 |
| feed flow rate F1 to F4 [mol/s] | 1.0 | 1.0 | 0.5 | 1.0 |
| Heat exchanging amount in condenser [kW] | 710 | 300 | 110 | 42 |
| Heat exchanging amount in evaporator [kW] | 710 | 300 | 110 | 42 |

After the simulation, the product having the composition shown in Table 3 was obtained.

Figure 2:
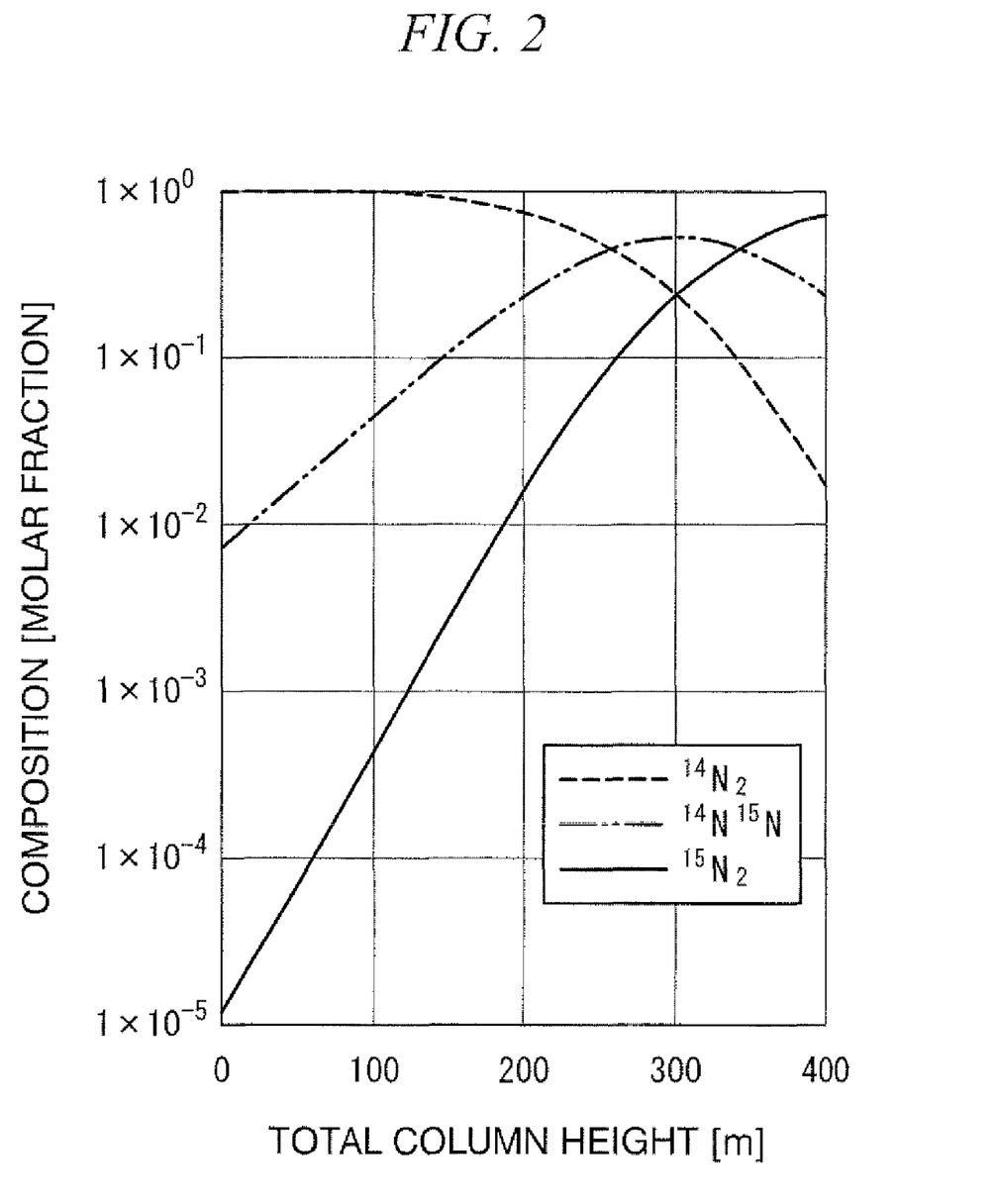
FIG. 2 shows one example of the composition of nitrogen isotopes in one distillation column.

The composition of $N_2$ which was treated in the isotope scrambler S1 is shown in Table 4. As a reference, the isotope composition distribution in the $N_2$ distillation columns is shown in FIG. 2.

TABLE 3

| Amount of the product [mol-$N_2$/s] | | 1.27 × 10$^4$ |
|---|---|---|
| Amount of the product [kg-$^{15}$N/y] | | 103 |
| The composition of the product | $^{14}N_2$ [mol %] | 1.7 |
| | $^{14}N^{15}N$ [mol %] | 24.4 |
| | $^{15}N_2$ [mol %] | 73.9 |
| Purity of $^{15}N$ isotope [atom %] | | 86.1 |
| Yield of $^{15}N$ [%] | | 3.0 |

TABLE 4

| | | Inlet (FSC) | Outlet (FRSC) | Amount of change |
|---|---|---|---|---|
| Throughput | [mol-$N_2$/s] | 0.01 | 0.01 | — |
| The composition of $N_2$ treated | | | | |
| $^{14}N_2$ | [mol %] | 24.6 | 25.6 | 0.92 |
| $^{14}N^{15}N$ | [mol %] | 51.8 | 50.0 | −1.84 |
| $^{15}N_2$ | [mol %] | 23.5 | 24.5 | 0.92 |
| $^{14}N$ | [atom %] | 50.5 | 50.5 | — |
| $^{15}N$ | [atom %] | 49.5 | 49.5 | — |

It is clear from the results that the product of concentrated $^{15}N$ isotope having a concentration of 86.1 atom % was obtained from the $N_2$ isotope mixture having a natural abundance ratio.

In addition, the yield percentage in Example is calculated in order to make the effects of the present invention clear.

The amount of $^{15}N_2$ contained in the raw material $N_2$ is calculated from Table 1 as follows.

$$[1.0 \text{ mol-}N_2/s] \times [13 \times 10^{-6}] = 13 \times 10^{-6} \text{ mol-}^{15}N_2/s$$

From Table 3, the amount of $^{15}N_2$ contained in the product P is calculated as follows.

$$[1.27 \times 10^{-4} \text{ mol-}N_2/s] \times [0.739] = 9.38 \times 10^{-5} \text{ mol-}^{15}N_2/s$$

Therefore, the apparent yield percentage of $^{15}N_2$ is calculated as follows.

$$[9.38 \times 10^{-5}] \div [13 \times 10^{-6}] \times 100 = 720\%$$

The apparent yield percentage is much higher than 100%. This effect could be obtained by combining the isotope scrambling and the $N_2$ distillation.

It is clear from Table 4 that the following amount of $^{15}N_2$ was newly produced.

$$[\text{The amount of throughput } 0.01 \text{ mol-}N_2/s] \times [^{15}N_2 \text{ composition change } 0.0092] = 9.2 \times 10^{-5} \text{ mol-}^{15}N_2/s$$

Concerning this calculated value, the yield percentage of $^{15}N_2$ is calculated as follows.

$$[9.38 \times 10^{-5}] \div [13 \times 10^{-6} + 9.2 \times 10^{-5}] \times 100 = 89.3\%$$

This yield percentage shows that an extremely highly percentage of $^{15}N_2$ was removed. It is clear that the method of the present invention is remarkably effective.

Next, the yield percentage of $^{15}N$ in the method of the present invention is also calculated. In general, the yield percentage of $^{15}N$ isotope is the benchmark of process efficiency in the isotope separation.

From Table 1, $^{15}N$ contained in the raw material $N_2$ is calculated as follows.

$$[1.0 \text{ mol-}N_2/s] \times [2 \text{ mol-}N/\text{mol-}N_2] \times [0.00365] = 7.3 \times 10^{-3} \text{ mol-}^{15}N/s$$

On the other hand, $^{15}N$ contained in the product P is calculated from Table 3 as follows.

$$[1.27 \times 10^{-4} \text{ mol-}N_2/s] \times [2 \text{ mol-}N/\text{mol-}N_2] \times [0.861] = 2.19 \times 10^{-4} \text{ mol-}^{15}N/s$$

Therefore, the yield percentage of $^{15}N$ is calculated as follows.

$$[2.19 \times 10^{-4}] \div [7.3 \times 10^{-3}] \times 100 = 3.0\%$$

Example 2

In Example 1, $N_2$ which does not contain argon and oxygen by purifying highly in advance was used as the raw material. However, the isotope concentration was simulated using a raw material $N_2$ which contains argon of 50 ppm and oxygen of 0.1 ppm in this example.

Figure 3:
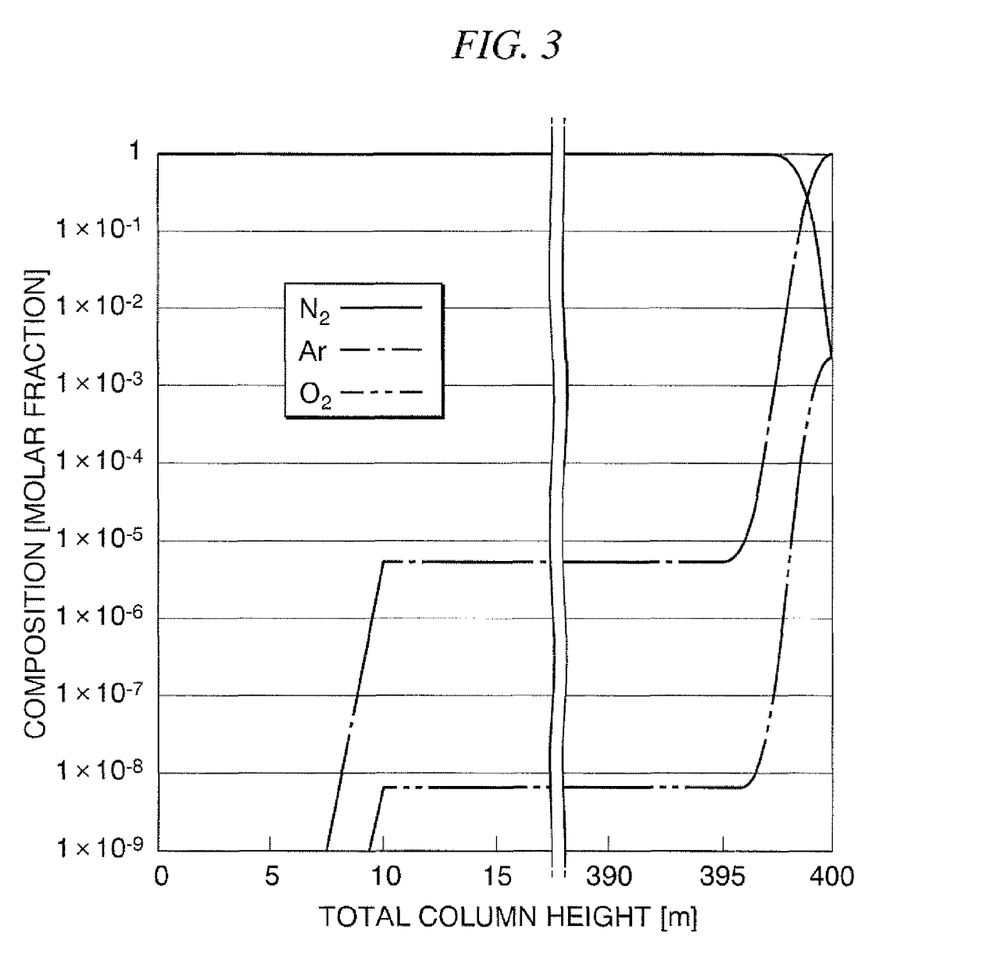
FIG. 3 shows the concentration of argon and oxygen in the distillation columns.

FIG. 3 shows the composition of nitrogen, argon, and oxygen in the distillation columns. Regarding nitrogen $N_2$, molecules ($^{14}N_2$, $^{14}N^{15}N$, and $^{15}N_2$) containing the isotope are not distinguished. In FIG. 3, the composition of the three component system, $N_2$–Ar–$O_2$ is plotted It is clear from FIG. 3 that argon and oxygen are suddenly concentrated at around the bottom portion of the final column. In this example, nitrogen containing concentrated $^{15}N$ was collected at $1.27 \times 10^{-4}$ mol/s from a position 5 m above (packed height from the first column: 395 m) the bottom of the final column, similar to Example 1. The collected nitrogen contained argon at 4.7 ppm, and oxygen at 0.006 ppm. The nitrogen isotope composition is the same as that shown in Table 3.

In order to prevent argon and oxygen from being continuously concentrated in the apparatus, the gas containing concentrated argon and oxygen is removed from the apparatus.

In this example, the amount of the gas removed from the bottom portion of the final column was adjusted to the total amount of argon and oxygen contained in the raw material nitrogen.

$$[\text{Raw material } 1 \text{ mol/s}] \times \{[\text{Argon } 50 \times 10^{-6}] + [\text{Oxygen } 0.1 \times 10^{-6}]\} = 5.01 \times 10^{-5} \text{ mol/s}$$

Therefore, the composition of the gas collected from the bottom portion of the final column was nitrogen at 0.3 mol %, argon at 99.5%, and oxygen at 0.2 mol %. The collected gas contained a very slight amount of $^{15}N_2$.

In actual operation, it is better to reduce the flow rate to a low percentage compared to the calculated result, in order to further decrease the amount of nitrogen in the collected gas. However, when the flow rate is decreased too much, more argon and oxygen contamination occurs in the product of nitrogen containing concentrated $^{15}N$ which is collected from the position 5 m above the bottom of the final column. Therefore, too much of a decrease in the flow rate is not preferable. In addition, when the amount of the gas collected from the bottom portion of the final column is too large, $^{15}N_2$ escapes together with argon and oxygen. This is not preferable. Concerning this, it is preferable that the flow rate of the gas collected from the bottom portion of the final column be in a range from 80 to 100% of the total amount of argon and oxygen contained in the raw material nitrogen.

According to this method, a very slight amount of nitrogen component is stored in the reboiler provided with the bottom portion of the final column. Thereby, it is not necessary to store the highly concentrated $^{15}N_2$ in the reboiler. Due to this, the operation time of the apparatus can be greatly reduced.

Comparative Example

Even when isotope scrambling is not performed, the percentage yield of $^{15}N$ is never 3%.

Even when the yield percentage of $^{15}N_2$ is assumed to be 100%, the lowest amount of the natural $N_2$ (natural abundance ratio) required to obtain the flow rate and the composition of the product shown in Table 3 is 7.22 mol-$N_2$/s.

$$[1.27 \times 10^{-4} \text{ mol-}N_2/s] \times [0.739] \div [13 \times 10^{-6}] = 7.22 \text{ mol-}N_2/s$$

This is 7.22 times that of Examples. When the yield (the yield based on the isotopes) of $^{15}N$ is calculated, the result is as follows.

$$\{[1.27 \times 10^{-4} \text{ mol-}N_2/s] \times [2 \text{ mol-}N/\text{mol-}N_2] \times [0.861]\} \div \{[7.22 \text{ mol-}N_2/s] \times [2 \text{ mol-}N/\text{mol-}N_2] \times [0.00365]\} \times 100 = 0.42\%$$

The yield percentage of $^{15}N_2$ is assumed to be 100% in this calculation.

Actually, however, the yield is 10% or less at most. Therefore, the actual yield percentage of $^{15}N$ is 0.042% or less.

INDUSTRIAL APPLICABILITY

According to the method for concentrating a heavy nitrogen isotope of the present invention, the heavy nitrogen isotope can be effectively concentrated to 50 atom % or more. A large amount of the concentrated heavy nitrogen isotope can be produced on an industrial scale.

The invention claimed is:

1. A method for concentrating a heavy nitrogen isotope $^{15}N$ in which $^{14}N^{15}N$ and/or $^{15}N_2$, which are molecules containing a heavy nitrogen isotope of $^{15}$N, are concentrated, wherein the method comprises:

distilling successively raw material nitrogen $N_2$ using plural distillation columns each of which comprises a condenser and a reboiler and is arranged in series, and a part of nitrogen in the distillation is drawn out to be subjected to isotope scrambling, and nitrogen after the isotope scrambling is returned to the distillation to produce nitrogen $N_2$ with a $^{15}$N concentration of 50 atom % or more, wherein supplying $N_2$ from a certain distillation column other than a final distillation column to another distillation column which is the next stage is performed using a pressure difference between the two distillation columns as driving force, and $N_2$ is present from a distillation column other than a first column to another distillation column of a former stage using a liquid head pressure of nitrogen as a driving force, and wherein a cooling fluid used in the condenser is nitrogen $N_2$ which is other than nitrogen $N_2$ to be distilled in the distillation step to control the pressure at the top of the distillation column provided with the condenser, and a pressure difference which is a driving force to supply $N_2$ to the distillation column is obtained.

2. A method for concentrating a heavy nitrogen isotope according to claim 1, wherein argon and/or oxygen are present in the raw material nitrogen in the plural distillation columns in an amount of 10 ppm or less.

3. A method for concentrating a heavy nitrogen isotope according to claim 1, wherein a gas or liquid containing nitrogen having a concentration of 3 mol % or less and concentrated argon and/or oxygen is discharged from the bottom portion of the final column, and a product containing concentrated $^{15}$N is obtained from the portion 2 to 10 m above the bottom of the final distillation column.

4. A method for concentrating a heavy nitrogen isotope according to claim 3, wherein the flow rate of a gas or liquid discharged from a bottom portion of the final distillation column is adjusted to 80% to 100% relative to 100% of a total amount of the argon and oxygen contained in the raw material nitrogen.

5. A method for concentrating a heavy nitrogen isotope $^{15}$N in which $^{14}$N$^{15}$N and/or $^{15}$N$_2$, which are molecules containing a heavy nitrogen isotope of $^{15}$N, are concentrated, wherein the method comprises:

distilling successively raw material nitrogen $N_2$ using plural distillation columns each of which comprises a condenser and a reboiler and is arranged in series, and a part of nitrogen in the distillation is drawn out to be subjected to isotope scrambling, and nitrogen after the isotope scrambling is returned to the distillation to produce nitrogen $N_2$ with a $^{15}$N concentration of 50 atom % or more, wherein supplying $N_2$ from a certain distillation column other than a final distillation column to another distillation column which is the next stage is performed using a pressure difference between the two distillation columns as driving force, and $N_2$ is present from a distillation column other than a first column to another distillation column of a former stage using a liquid head pressure of nitrogen as a driving force, and wherein a pipe for resending nitrogen $N_2$ from a distillation column to the former distillation column is cooled with liquid nitrogen which is other than the nitrogen in the distillation.

6. A method for concentrating a heavy nitrogen isotope according to claim 5, wherein a cooling fluid used in a condenser is used to cool the pipe.

7. A method for concentrating a heavy nitrogen isotope according to claim 5, wherein argon and/or oxygen are present in the raw material nitrogen in the plural distillation columns in an amount of 10 ppm or less.

8. A method for concentrating a heavy nitrogen isotope according to claim 5, wherein a gas or liquid containing nitrogen having the concentration of 3 mol % or less and concentrated argon and/or oxygen is discharged from the bottom portion of the final distillation column, and a product containing concentrated $^{15}$N is obtained from the portion 2 to 10 m above the bottom of the final distillation column.

9. A method for concentrating a heavy nitrogen isotope according to claim 8, wherein the flow rate of the gas or liquid discharged from the bottom portion of the final distillation column is adjusted to 80% to 100% relative to 100% of a total amount of the argon and oxygen contained in the raw material nitrogen.

* * * * *